Figure 1:
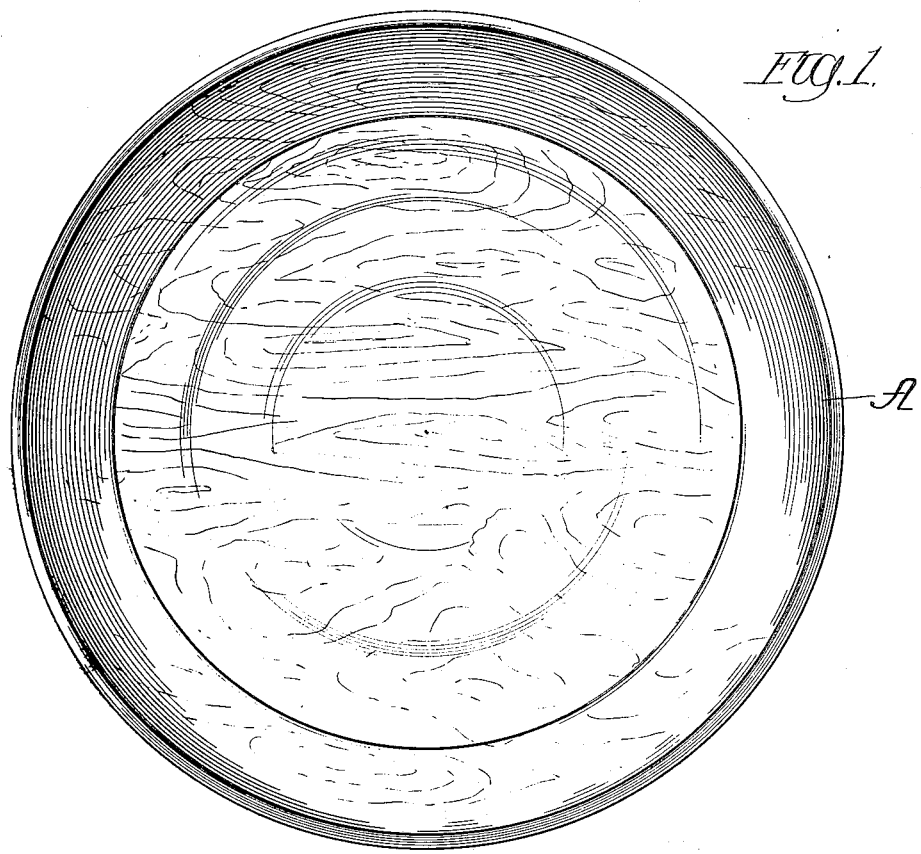

O. W. BRUNER.
BAKING PAN AND THE LIKE.
APPLICATION FILED JUNE 20, 1906.

914,238.

Patented Mar. 2, 1909.

FIBROUS MATERIAL

IMPREGNATED WITH SILICATE OF SODA

Witnesses:
H. G. Barrett
Louis B. Erwin

Inventor:
Otis W. Bruner
by Rector, Hibben & Davis
his Attys

UNITED STATES PATENT OFFICE.

OTIS W. BRUNER, OF CHICAGO, ILLINOIS, ASSIGNOR TO ROBERT J. GUNNING, OF CHICAGO, ILLINOIS.

BAKING-PAN AND THE LIKE.

No. 914,238.    Specification of Letters Patent.    Patented March 2, 1909.

Application filed June 20, 1906. Serial No. 322,560.

*To all whom it may concern:*

Be it known that I, OTIS W. BRUNER, a citizen of the United States, residing at Chicago, Cook county, Illinois, have invented certain new and useful Improvements in Baking-Pans and the Like, of which the following is a specification.

My invention relates to baking utensils such as baking pans, and the object thereof is to produce, as a new article of manufacture, a novel and efficient pan made from fibrous material as a substitute for the usual tin or metal baking pan and while my invention is more particularly applicable to pie pans and has special utility in the baking, handling and shipment of pies, yet my invention, in its broader aspect, is not limited thereto.

The principal object of my invention is to produce or provide such a character of pie plate made of inexpensive material such as paper board or wood veneer which is not only capable of serving as a baking pan in which the pie may be baked but also as a plate for such pie in which the pie is contained from the baking operation to the time that it reaches the consumer.

A further object of my invention is to provide such a character of pan as will retain all the juices and moisture and which will furthermore be cleanly and sanitary in every respect.

In practice, I prefer to employ wood veneer as the material of the pan, the same being suitably shaped in a die to correspond with the usual and conventional size and shape of pie plate or the like. To this wood veneer pan is applied silicate of soda or so-called liquid glass or if desired such pan may be dipped into a bath of such solution so as to become impregnated therewith. This pan after drying is now ready for use, the silicate of soda serving to prevent the burning or charring of the pan and also preventing the penetration of the juices or moisture therethrough. Furthermore, the nature of the solution employed has no deleterious effect upon the pie but whatever effect there may be is rather of a beneficial nature. Thus no metal plates at all are used in the baking but the pies are baked in these specially prepared fibrous plates, treated as above described, and are delivered in the same plates in which they are baked.

In practice I prefer to seal each individual pie together with its plate in paraffin or waxed paper or the like which is carefully wrapped therearound so as to insure freedom from uncleanliness by exposure or handling and prevent absorption of moisture and so forth and at the same time to preserve the freshness, cleanliness and the proper flavor so greatly desired.

Although I prefer to employ wood veneer as the material of the pan it is possible to use a paper board treated to the solution of silicate of soda in the manner already explained.

The invention is illustrated in a more or less diagrammatic manner in the accompanying drawing, in which—

Figure 2:
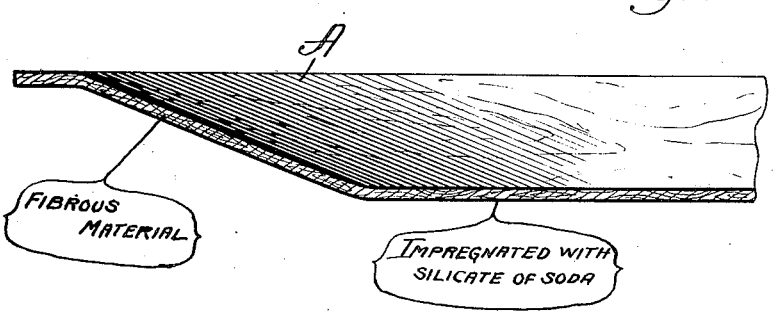

Figure 1 is a plan view of a conventional form of fibrous or wooden pie-plate and Fig. 2 a section of a portion thereof on an enlarged scale.

In the drawing, the plate A is made of fibrous material such as wood and the drawing so indicates by the legend "Fibrous material" and inasmuch as, by preference, the plate is impregnated with silicate of soda, the drawing so indicates by the second legend "Impregnated with silicate of soda."

I claim:

1. As a new article of manufacture, a combined baking pie pan and pie plate composed of a fibrous material to which silicate of soda has been applied, said article serving as a pan in which the pie is baked and as a plate in which the pie is served.

2. As a new article of manufacture, a combined baking pie pan and pie plate composed of a fibrous material impregnated with silicate of soda, said article serving as a pan in which the pie is baked and as a plate in which the pie is served.

3. As a new article of manufacture, a baking pan or the like composed of wood veneer impregnated with silicate of soda and serving both as the baking pan and as the pan for thereafter containing the article in the subsequent handling and selling thereof.

OTIS W. BRUNER.

Witnesses:
CLARENCE E. MILLER,
E. A. GULLICKSON.